(12) United States Patent
Williams et al.

(10) Patent No.: US 8,296,562 B2
(45) Date of Patent: Oct. 23, 2012

(54) OUT OF BAND SYSTEM AND METHOD FOR AUTHENTICATION

(75) Inventors: Jeffrey B. Williams, Arlington, VA (US); Allan Camaisa, La Jolla, CA (US)

(73) Assignee: Anakam, Inc., San Diego, CA (US)

( * ) Notice: Subject to any disclaimer, the term of this patent is extended or adjusted under 35 U.S.C. 154(b) by 639 days.

(21) Appl. No.: 12/434,442

(22) Filed: May 1, 2009

(65) Prior Publication Data

US 2009/0259848 A1 Oct. 15, 2009

Related U.S. Application Data

(63) Continuation-in-part of application No. 11/824,694, filed on Jul. 2, 2007, which is a continuation-in-part of application No. 11/257,421, filed on Oct. 24, 2005, which is a continuation-in-part of application No. 11/077,948, filed on Mar. 11, 2005, now Pat. No. 8,079,070, which is a continuation-in-part of application No. 10/892,584, filed on Jul. 15, 2004, now Pat. No. 7,676,834.

(51) Int. Cl.
*H04L 29/06* (2006.01)
(52) U.S. Cl. ..................................... 713/155
(58) Field of Classification Search .................. None
See application file for complete search history.

(56) References Cited

U.S. PATENT DOCUMENTS

| | | | |
|---|---|---|---|
| 5,590,199 A | 12/1996 | Krajewski et al. | |
| 5,737,421 A | 4/1998 | Audebert | |
| 5,802,176 A | 9/1998 | Audebert | |
| 5,887,065 A | 3/1999 | Audebert | |
| 5,937,068 A | 8/1999 | Audebert | |
| 5,982,898 A | 11/1999 | Hsu et al. | |
| 6,035,404 A | 3/2000 | Zhao | |
| 6,047,268 A | 4/2000 | Bartoli et al. | |
| 6,076,163 A | 6/2000 | Hoffstein | |
| 6,085,320 A | 7/2000 | Kaliski | |
| 6,130,621 A | 10/2000 | Weiss | |
| 6,157,920 A | 12/2000 | Jakobsson | |
| 6,189,098 B1 | 2/2001 | Kaliski | |
| 6,202,159 B1 | 3/2001 | Ghafir et al. | |
| 6,240,184 B1 | 5/2001 | Huynh | |
| 6,269,163 B1 | 7/2001 | Rivest | |
| 6,286,022 B1 | 9/2001 | Kaliski | |
| 6,301,362 B1 * | 10/2001 | Matyas et al. | ............. 380/37 |
| 6,308,268 B1 | 10/2001 | Audebert | |
| 6,317,777 B1 | 11/2001 | Skarbo | |

(Continued)

FOREIGN PATENT DOCUMENTS

WO 2003/007571 1/2003

OTHER PUBLICATIONS

Amendment and Response to Non-Final Office Action for U.S. Appl. No. 11/824,694, filed Jan. 19, 2012 (31 pages).

(Continued)

*Primary Examiner* — Oscar Louie
(74) *Attorney, Agent, or Firm* — Kilpatrick Townsend & Stockton LLP

(57) ABSTRACT

A method and system for out of band authentication for ensuring a user is in possession of a device.

19 Claims, 3 Drawing Sheets

U.S. PATENT DOCUMENTS

| | | | |
|---|---|---|---|
| 6,373,969 B1 | 4/2002 | Adler |
| 6,374,359 B1 | 4/2002 | Shrader |
| 6,389,442 B1 | 5/2002 | Yin |
| 6,393,447 B1 | 5/2002 | Jakobsson |
| 6,411,715 B1 | 6/2002 | Liskov |
| 6,429,927 B1 | 8/2002 | Borza |
| 6,434,259 B1 | 8/2002 | Hamid |
| 6,446,052 B1 | 9/2002 | Juels |
| 6,446,210 B1 | 9/2002 | Borza |
| 6,460,141 B1 | 10/2002 | Olden |
| 6,498,861 B1 | 12/2002 | Hamid |
| 6,584,505 B1 | 6/2003 | Howard et al. |
| 6,598,072 B1 | 7/2003 | McBrearty et al. |
| 6,662,231 B1 | 12/2003 | Drosset et al. |
| 6,694,436 B1 | 2/2004 | Audebert |
| 6,700,606 B1 | 3/2004 | Borza |
| 6,721,891 B1 | 4/2004 | Borza |
| 6,751,654 B2 | 6/2004 | Marrarani |
| 6,760,844 B1 | 7/2004 | McCarthy et al. |
| 6,769,068 B1 | 7/2004 | Brozowski et al. |
| 6,772,954 B2 | 8/2004 | Boyer |
| 6,813,354 B1 | 11/2004 | Jakobsson |
| 6,831,980 B1 | 12/2004 | Borza |
| 6,836,845 B1 | 12/2004 | Lennie et al. |
| 6,848,052 B2 | 1/2005 | Hamid |
| 6,857,078 B2 | 2/2005 | Colvin |
| 7,032,026 B1 | 4/2006 | Biswas |
| 7,100,049 B2 | 8/2006 | Gasparini et al. |
| 7,275,263 B2 | 9/2007 | Bajikar et al. |
| 7,345,775 B2 | 3/2008 | Kimura |
| 7,346,775 B2 | 3/2008 | Gasparinl et al. |
| 7,360,096 B2 | 4/2008 | Bracewell et al. |
| 7,418,596 B1 | 8/2008 | Carroll |
| 7,426,530 B1 | 9/2008 | Rosko |
| 7,464,162 B2 | 12/2008 | Chan |
| 7,536,433 B2 | 5/2009 | Reilly |
| 7,562,222 B2 | 7/2009 | Gasparini et al. |
| 7,571,466 B2 | 8/2009 | Mitchell et al. |
| 7,665,127 B1 | 2/2010 | Rao |
| 7,676,834 B2 | 3/2010 | Camaisa |
| 7,685,631 B1 | 3/2010 | Paya et al. |
| 7,725,490 B2 | 5/2010 | Hitchen et al. |
| RE41,546 E | 8/2010 | Vainstein |
| 7,822,989 B2 | 10/2010 | Libin et al. |
| 8,006,300 B2 * | 8/2011 | Mizrah .......................... 726/20 |
| 8,078,873 B2 * | 12/2011 | Shah et al. ................... 713/169 |
| 8,079,070 B2 | 12/2011 | Camaisa |
| 2001/0014895 A1 | 8/2001 | Sappal |
| 2001/0029585 A1 | 10/2001 | Simon et al. |
| 2001/0037451 A1 | 11/2001 | Bhagavatula |
| 2001/0037466 A1 | 11/2001 | Fukutake et al. |
| 2001/0044896 A1 | 11/2001 | Schwartz et al. |
| 2002/0029279 A1 | 3/2002 | Campbell et al. |
| 2002/0031230 A1 | 3/2002 | Sweet et al. |
| 2002/0131402 A1 | 9/2002 | Lee |
| 2002/0133706 A1 | 9/2002 | Khanna et al. |
| 2002/0169961 A1 | 11/2002 | Giles |
| 2002/0184496 A1 | 12/2002 | Mitchell et al. |
| 2003/0005308 A1 | 1/2003 | Rathbun et al. |
| 2003/0018707 A1 | 1/2003 | Flocken |
| 2003/0033245 A1 | 2/2003 | Kahr |
| 2003/0046551 A1 | 3/2003 | Brennan |
| 2003/0093430 A1 | 5/2003 | Mottur |
| 2003/0097573 A1 | 5/2003 | Wheeler |
| 2003/0140230 A1 | 7/2003 | De Jong et al. |
| 2003/0149900 A1 | 8/2003 | Glassman et al. |
| 2003/0159068 A1 | 8/2003 | Halpin et al. |
| 2003/0163739 A1 | 8/2003 | Armington et al. |
| 2003/0177351 A1 | 9/2003 | Skingle |
| 2003/0188186 A1 | 10/2003 | Cherry |
| 2003/0200202 A1 | 10/2003 | Hsiao |
| 2003/0217288 A1 | 11/2003 | Guo et al. |
| 2003/0229782 A1 | 12/2003 | Bible, Jr. et al. |
| 2004/0059951 A1 | 3/2004 | Pinkas et al. |
| 2004/0098609 A1 | 5/2004 | Bracewell et al. |
| 2004/0103203 A1 | 5/2004 | Nichols et al. |
| 2004/0103297 A1 | 5/2004 | Risan et al. |
| 2004/0103300 A1 | 5/2004 | Risan et al. |
| 2004/0111621 A1 | 6/2004 | Himberger et al. |
| 2004/0123103 A1 | 6/2004 | Risan et al. |
| 2004/0136510 A1 | 7/2004 | Vander Veen |
| 2004/0139318 A1 | 7/2004 | Fiala et al. |
| 2004/0143523 A1 | 7/2004 | Pegaz-Paquet |
| 2004/0168083 A1 | 8/2004 | Gasparini et al. |
| 2004/0172535 A1 | 9/2004 | Jakobsson |
| 2004/0187018 A1 | 9/2004 | Owen |
| 2004/0250076 A1 | 12/2004 | Kung |
| 2005/0015601 A1 | 1/2005 | Tabi |
| 2005/0108551 A1 | 5/2005 | Toomey |
| 2005/0138109 A1 | 6/2005 | Redlich et al. |
| 2005/0160042 A1 | 7/2005 | Russell et al. |
| 2005/0176449 A1 | 8/2005 | Cui et al. |
| 2005/0177730 A1 | 8/2005 | Davenport et al. |
| 2005/0183032 A1 | 8/2005 | Bushey |
| 2005/0268100 A1 | 12/2005 | Gasparini et al. |
| 2005/0268107 A1 | 12/2005 | Harris |
| 2005/0269401 A1 * | 12/2005 | Spitzer et al. ................... 235/380 |
| 2006/0015742 A1 | 1/2006 | Camaisa et al. |
| 2006/0015743 A1 | 1/2006 | Camaisa |
| 2006/0069921 A1 | 3/2006 | Camaisa |
| 2006/0106605 A1 | 5/2006 | Saunders et al. |
| 2006/0206709 A1 * | 9/2006 | Labrou et al. ................... 713/167 |
| 2007/0136517 A1 | 6/2007 | Edling |
| 2007/0136573 A1 | 6/2007 | Steinberg |
| 2007/0180496 A1 | 8/2007 | Fransdonk |
| 2007/0266257 A1 | 11/2007 | Camaisa et al. |
| 2008/0091682 A1 | 4/2008 | Lim |
| 2008/0098464 A1 * | 4/2008 | Mizrah ............................ 726/5 |
| 2008/0114980 A1 | 5/2008 | Sridhar |
| 2008/0189776 A1 | 8/2008 | Constable |
| 2008/0201159 A1 | 8/2008 | Gabrick et al. |
| 2008/0250477 A1 | 10/2008 | Samuelsson et al. |
| 2008/0301570 A1 | 12/2008 | Milstead et al. |
| 2009/0094674 A1 | 4/2009 | Schwartz et al. |
| 2009/0167486 A1 * | 7/2009 | Shah et al. ..................... 340/5.2 |
| 2009/0235339 A1 * | 9/2009 | Mennes et al. .................... 726/5 |
| 2009/0259848 A1 | 10/2009 | Williams |
| 2009/0327724 A1 * | 12/2009 | Shah et al. ..................... 713/169 |
| 2010/0100967 A1 | 4/2010 | Douglas |
| 2010/0185860 A1 * | 7/2010 | Mishra et al. .................. 713/169 |

OTHER PUBLICATIONS

Response to Non-Final Office Action for U.S. Appl. No. 12/142,232, filed Feb. 6, 2012 (10 pages).

Notice of Allowance for U.S. Appl. No. 11/257,421, mailed Mar. 19, 2012 (5 pages).

Final Office Action for U.S. Appl. No. 11/824,694 mailed Mar. 29, 2012 (34 pages).

Non-Final Office Action for U.S. Appl. No. 11/077,948, mailed Oct. 16, 2008 (11 pages).

Non-Final Office Action for U.S. Appl. No. 11/077,948, mailed Apr. 9, 2009 (8 pages).

Non-Final Office Action for U.S. Appl. No. 11/077,948, mailed Jul. 16, 2009 (8 pages).

Final Office Action for U.S. Appl. No. 11/077,948, mailed Dec. 7, 2010 (11 pages).

Non-Final Office Action for U.S. Appl. No. 11/077,948, mailed Jan. 24, 2011 (10 pages).

Non-Final Office Action for U.S. Appl. No. 11/257,421, mailed Dec. 29, 2008 (12 pages).

Final Office Action for U.S. Appl. No. 11/257,421, mailed Apr. 20, 2009 (21 pages).

Non-Final Office Action for U.S. Appl. No. 11/257,421, mailed Oct. 19, 2009 (20 pages).

Non-Final Office Action for U.S. Appl. No. 11/257,421, mailed Apr. 14, 2010 (25 pages).

Final Office Action for U.S. Appl. No. 11/257,421, mailed Jul. 7, 2010 (29 pages).

Non-Final Office Action for U.S. Appl. No. 12/142,232, mailed Dec. 9, 2010 (11 pages).

Final Office Action for U.S. Appl. No. 12/142,232, mailed Mar. 29, 2011 (11 pages).

Non-Final Office Action for U.S. Appl. No. 11/824,694, mailed Jan. 10, 2011 (30 pages).

Final Office action for U.S. Appl. No. 11/824,694, mailed Mar. 1, 2011 (33 pages).

International Search Report and Written Opinion for PCT/US10/33194, mailed Jun. 24, 2010 (3 pages).

Response to Office Action for U.S. Appl. No. 11/077,948, filed Jan. 4, 2011 (8 pages).

Response to Office Action for U.S. Appl. No. 11/077,948, filed Jan. 7, 2009 (4 pages).

Response to Office Action for U.S. Appl. No. 11/077,948, filed May 7, 2009 (4 pages).

Amendment and Response to Non-Final Office Action for U.S. Appl. No. 11/077,948, filed May 25, 2011 (14 pages).

Response to Office Action for U.S. Appl. No. 11/077,948, filed Oct. 5, 2009 (6 pages).

Amendment and Supplemental Response to Office Action for U.S. Appl. No. 11/077,948, filed Nov. 12, 2009 (7 pages).

Response to Office Action for U.S. Appl. No. 11/257,421, filed Oct. 20, 2009 (3 pages).

Response to Office Action for U.S. Appl. No. 11/257,421, filed Jan. 15, 2009 (5 pages).

Response to Office Action for U.S. Appl. No. 11/257,421, filed Jan. 16, 2009 (5 pages).

Response to Office Action for U.S. Appl. No. 11/257,421, filed Apr. 16, 2010 (8 pages).

Response to Office Action for U.S. Appl. No. 11/824,694, filed Jun. 25, 2010 (18 pages).

Amendment and Response to Final Office Action for U.S. Appl. No. 11/824,694, filed Jul. 1, 2011 (22 pages).

Response to Office Action for U.S. Appl. No. 11/824,694, filed Dec. 2, 2010 (12 pages).

Response to Office Action for U.S. Appl. No. 11/824,694, filed Jan. 19, 2011 (14 pages).

Response to Notice of Non-Compliant Amendment for U.S. Appl. No. 12/142,232, filed Jan. 20, 2011 (8 pages).

File history for U.S. Appl. No. 10/892,584 (487 pages), filed Jul. 15, 2004.

Amendment and Response to Final Office Action, for U.S. Appl. No. 12/142,232, filed Jul. 29, 2011 (11 pages).

David M. Piscitello, Lisa Phifer, "Best Practices for securing enterprise network", Business Communications Review. Hinsdale; Dec. 2002. vol. 32, Iss. 12; p. 32, 8 pgs.

Rodry, "Cookie based authentication: is it secure?", Published on Aug. 28, 2000, http://www.perimonks.org?node.sub.--id=29928, Retrieved data Apr. 10, 2009.

Allan Camaisa, et al. "System and method for blocking unauthorized network log in using stolen password", File History of co-pending U.S. Appl. No. 11/824,694, filed Jul. 2, 2007.

Jonas Sammuelsson, et al. "System and method for second factor authentication services", File History of co-pending U.S. Appl. No. 12/142,232, filed Jun. 19, 2008.

U.S. Appl. No. 11/077,948, Notice of Allowance mailed Aug. 12, 2011 (11 pages).

U.S. Appl. No. 11/257,421, Office Action mailed Nov. 28, 2011 (6 pages).

U.S. Appl. No. 11/824,694, Office Action mailed Sep. 19, 2011 (27 pages).

U.S. Appl. No. 12/142,232, Office Action mailed Oct. 6, 2011 (13 pages).

U.S. Appl. No. 12/475,028, Office Action mailed Jan. 5, 2012 (12 pages).

* cited by examiner

OUT OF BAND SYSTEM AND METHOD FOR AUTHENTICATION

RELATED APPLICATIONS

This application is a continuation-in-part of and claims priority from co-pending U.S. patent application Ser. No. 11/824,694, filed Jul. 2, 2007, which is a continuation-in-part of U.S. patent application Ser. No. 11/257,421, filed Oct. 24, 2005, which is a continuation-in-part of U.S. patent application Ser. No. 11/077,948, filed Mar. 11, 2005 now U.S. Pat. No. 8,079,070, which in turn is a continuation in part of Ser. No. 10/892,584, filed Jul. 15, 2004 now U.S. Pat. No. 7,676,834, all of which are incorporated herein by reference and from all of which is priority claimed.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to methods and systems for authenticating an electronic identity assertion, with a very high confidence that the asserted electronic identity belongs to the person who is asserting it, as opposed to someone who is attempting to pose as another.

User names and passwords are a ubiquitous way to provide a minimal level of authentication to a computer user seeking to access a system provided to a network of computers such as the World Wide Web (WWW) or to a similar local network. For instance, typical online banking systems require users to log on to a Web server belonging to a financial institution using a user name and password that have been previously given to the user by the institution. In this way, only a user (hopefully, the true account owner) who possesses both the user name and the password can gain access to that user's account.

In another example, subscription services and sales are often provided via the WWW. For instance, users can subscribe to Web sites to receive news, music, movies, and the like and to purchase almost anything. To ensure that only users who have paid (or will be subsequently be charged for) the subscription fee and/or services can access the content or purchase the goods or services, a user seeking access is required to log in using a user name and password.

In either case, it is possible that a password can be stolen and information and products/services/money intended only for the rightful owner of the password can consequently fall into the hands of a password thief.

And the problem is getting worse. As was recently noted in the Wall Street Journal (Feb. 2, 2009, "The Menace in the Machines: Cyber-Scams On The Uptick In Downturn"), "The bear economy is creating a bull market for cyber-crooks. Avivah Litan, vice president with Internet-technology research company Gartner Inc, said clients are telling her that cyber-assaults on many banks have doubled in the past six months in the U.S. and other parts of the world, including the U.K., Canada, Mexico aid Brazil. Though most are thwarted by computer-security defenses, such as spam filters and fraud-detection systems that still leaves potentially millions of victims.

'They are all experiencing a lot more attacks, and a lot more ATM fraud' aimed at depositors' accounts, Ms. Litan said.

More than 800 complaints have been logged by the National White Collar Crime Center in Richmond, Va., so far this year from checking-account customers in the U.S. about mysterious, unauthorized transactions of $10 to $40 that appear on monthly statements. Craig Butterworth, a spokesman for the center, a federally funded group that assists police agencies, said investigators suspect a data breach or 'phishinig' campaign, where deceptive emails and text messages are used to acquire personal information, such as Social Security numbers, user names and passwords.

The FBI's Internet Crime Complaint Center confirms an increase in cyber-attacks. In its most recent Internet Crime Report, the FBI said it received 207,000 complaints about crimes perpetrated over the Internet in 2007, the latest year for which data is available, amounting to nearly $240 million a year earlier."

To ameliorate this problem and minimize the risk of this threat, some institutions have shifted to the implementation of single token, multi-factor authentication solutions using multi-factor cryptographic tokens or multi-factor one-time password devices. Such solutions, which are well known in the art, have heretofore depended upon the costly and cumbersome-distribution of a card or a token to the end users. In the multi-factor cryptographic token and multi-factor one-time password solutions, these deployments face additional challenges because the proper implementation requires a cryptographic key release from the device based upon the use of a password associated with that device. Such devices are costly, and implementations are time consuming and logistically cumbersome to deploy and manage especially for large-scale heterogeneous user-bases. NIST Special Publication 800-63-1, Electronic Authentication Guideline, Dec. 8, 2008, provides technical guidelines for implementing various electronic authentication methods and systems and is incorporated by reference.

BRIEF SUMMARY OF THE INVENTION

Systems and methods for using out-of-band authentication to confirm the asserted electronic identity of an individual and control the release of a cryptographic key are disclosed herein. When confirming to a very high level of confidence that the asserted electronic identity is that of registered to the individual, these confirm that a person conducting a transaction is who she claims she is by confirming first, something she knows, using a username and password (or username only) as a shared knowledge token, and; confirming second, something she has, the item registered to him; and third, confirming the fact that she has control over that item. Once each of these confirmations is established, a cryptographic key may be released by the out-of-band authentication process. The cryptographic key released will either be specific to the individual or will be specific to the system that actually releases the key. If the system releases a key that is not specific to the individual, the association with the individual who authenticated the release of the key, thereby establishing non-repudiation of the key, shall be provided by association of the specific transmission of the system key with the unique authentication transaction through auditable logging. The cryptographic key released by the out-of-band authentication may be either symmetric or asymmetric, that is, one key may be used to generate a message authentication code and to verify the code, or two related keys, a public key and a private key, may be used for signature generation and signature verification, respectfully.

The methods and systems disclosed herein can be used for any sensitive online transaction in which strong assurance of the asserted and the actual electronic identity of the end-user is required. This includes, but is not limited to, electronic government, healthcare, banking, and commercial transactions performed on a network infrastructure including the WWW. The details of the present invention, both as to its structure and operation, can best be understood in reference to the accompanying drawings, in which like reference numerals refer to like parts, and in which:

DETAILED DESCRIPTION OF THE DRAWINGS AND THE PRESENTLY PREFERRED EMBODIMENTS

Figure 1:
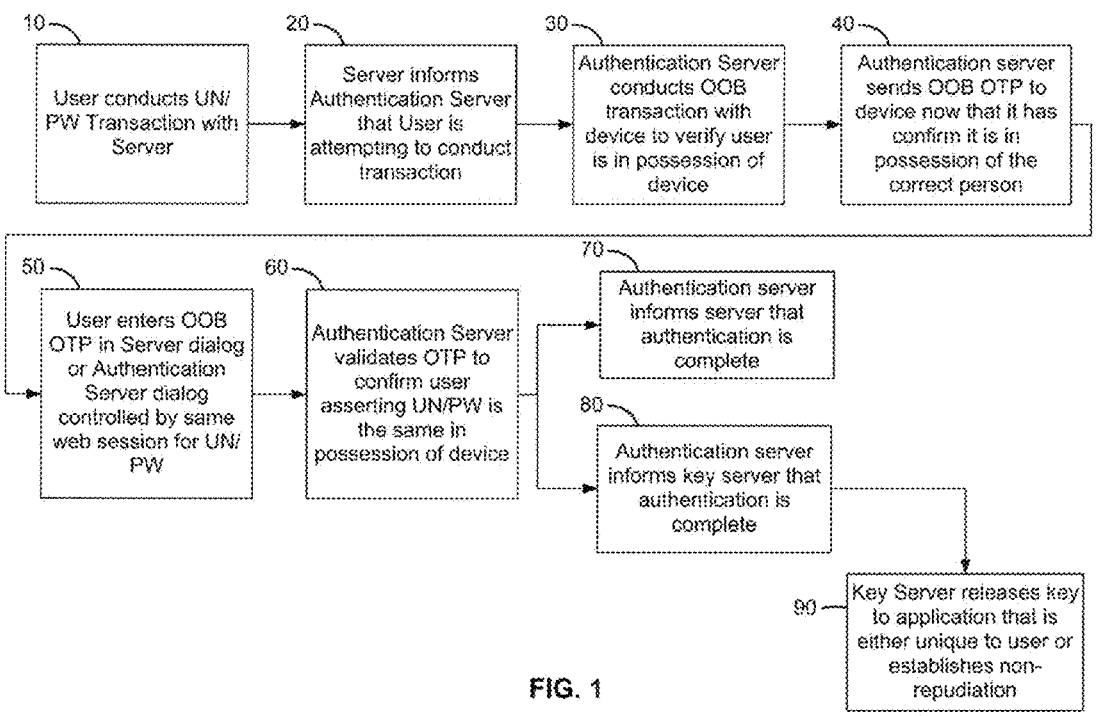
FIG. 1 shows the overall general process flow for carrying out embodiments of the method of the present invention.

Referring first to FIG. 1, the general overall process flow for carrying out the methods disclosed herein and using the systems disclosed herein is shown and described. It is to be understood that this description can be implemented in various systems and with various insignificant modifications but still within the scope of the present invention. The steps of the general method will be described in more detail in conjunction with the description of various embodiments of the system of the present invention that follow.

Turning to system flow diagram, At 10, according to the general method of the present invention, a first user conducts a user name/password transaction with a network server as a means of establishing his identity electronically. Next, at 20, the network server informs an authentication server (both which may be a single system or device) that a user is attempting to conduct a transaction. Next, at 30, the authentication server conducts an out-of-band (OOB) transaction with the user's device to verify that the user is in possession of the device. Next, at 40, the authentication server sends an OOB one-time passcode (OTP) to the device that it has confirmed that is in the possession of the correct person. Next, at 50, the user enters the OOB OTP into the server dialogue or the authentication service dialogue, as applicable, which is controlled by the same Web session as the user name/password transaction. Next, at 60, the authentication server validates the OTP to confirm the user asserting the user name/password is the same as the person in possession of the device. Next, two things can happen. Either the authentication server informs the server that authentication process is complete (70), or the authentication server informs the key server that the authorization is complete (80). Finally, at 90, the key server releases a key to the application that is either unique to the user or that establishes non-repudiation.

Figure 2:
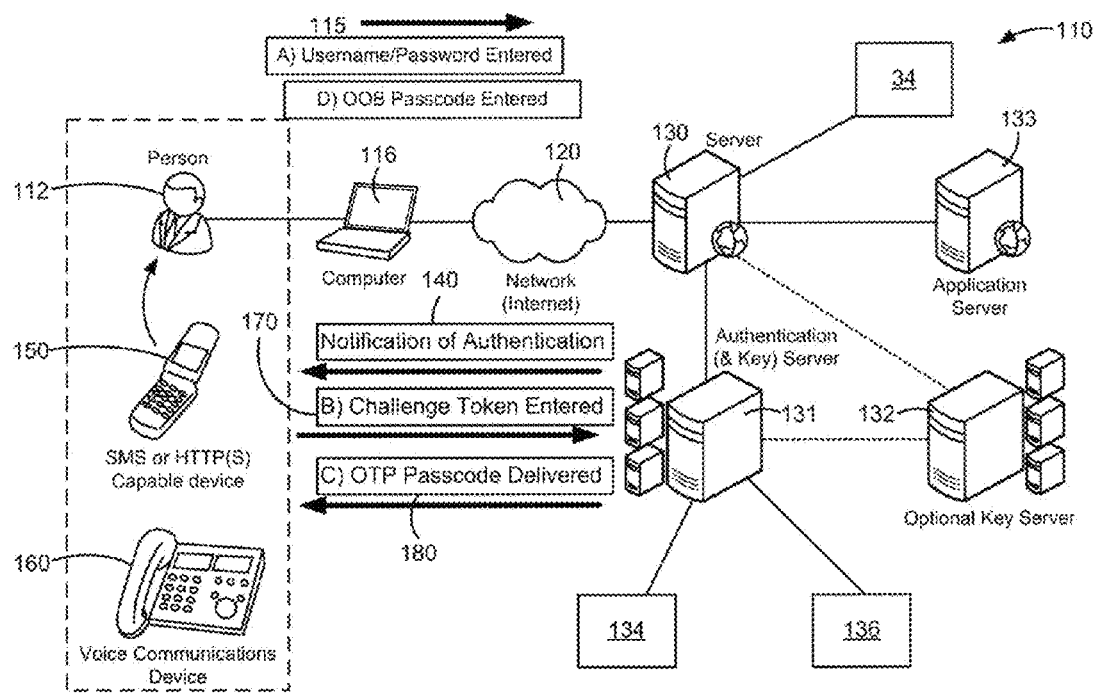
FIG. 2 shows a first embodiment of a system of the present invention along with a method according to the present invention being carried out.

A first embodiment of the system disclosed herein as shown in FIG. 2, and the system generally is designed to carry out the general process disclosed in FIG. 1. System 110 comprises a network that makes use of the method of the present invention. Any other suitable network or system may be used however, as well as the WWW. User 112 makes use of computers 116 (only a single computer is shown for clarity), each of which can have a processor and disk and/or solid state program storage for storing software embodying logic, as is well known. Any suitable personal computer, personal digital assistant (PDA), cellular phone, or the like may also be used. Also, each user computer 116 may include one or more input devices such as keyboards, mice, voice recognition devices, etc. as well as one or more output devices such as monitors, printers, other computers, etc., again as is well known As is further shown in FIG. 2, user computer 116 communicates with server 130 over the WWW 120, a private wide-area network, an internal enterprise network infrastructure, or other equivalent network or combination thereof. Server 130 has a processor and disk and/or solid state storage for storing software embodying logic including all or part of the logic discussed further below necessary for carrying out the present invention, and can be a server of any suitable type for this application. Server 130 may be attached to a plurality of independent servers or can carry out certain functions by itself. All functions may totally be provided on a single physical server. In the embodiment shown, Authentication & Key Server 131 accesses Customer Information Database Server 134 that contains the log in and registration information for various users. It is understood that the database may be pre-populated with user information on existing customers who elect to start up a service utilizing the systems and methods of the present invention. Authentication & Key Server 131 may also access Information Database 136 to supply users with desired information, e.g., bank account records, subscription content, etc. The databases may be implemented in a single data structure if desired, and are databases of any suitable type kept on any suitable hardware, including on the Application & Key Server 131 itself. There also may be a support key server 132 and an application server 133.

When a user submits his username and password (115) to the Web site or application hosted on server 130, the username and password are validated by the Server 130. If valid, the Authentication Server 131 receives the username, or a unique reference thereto, from the Server 130. Next, at least two potential processes may occur, but any other suitable method or variation of this method may also occur.

The first embodiment contemplates a Server-based validation of device possession process, as is further shown in FIG. 2. According to this process, Authentication Server 131 sends an out-of-band Authentication Notification Message (ANM) 140 via short message service (SMS) or other suitable channel to a pre-registered SMS capable device 150 (such as a cell phone, pager, satellite phone, or land-mobile radio) or interactive voice response (IVR) call to a pre-registered voice device 160 (such as a cell phone, home phone, or office phone). This ANM informs the user that a transaction is being conducted and prompts him to enter a secret personal knowledge Token 170 (different from the password entered previously) (e.g. a memorized number or phrase), confirming that he has possession of the device (150 or 160). That personal knowledge token is returned to the Authentication and Key Server 131 as a response using the same channel from which the prompt to enter in was received (e.g. SMS reply, voice response, dual-tone multi frequency (DTMF) entry). Upon receipt of the Token 170 by the Authentication & Key Server 131, if properly validated, a one-time-passcode (OTP) 180 is distributed by the Authentication and Key Server 131 to the user via the pre-registered device (150 or 160) that was just previously validated in their possession. This OTP is then entered by the User to complete the transaction.

Figure 3:
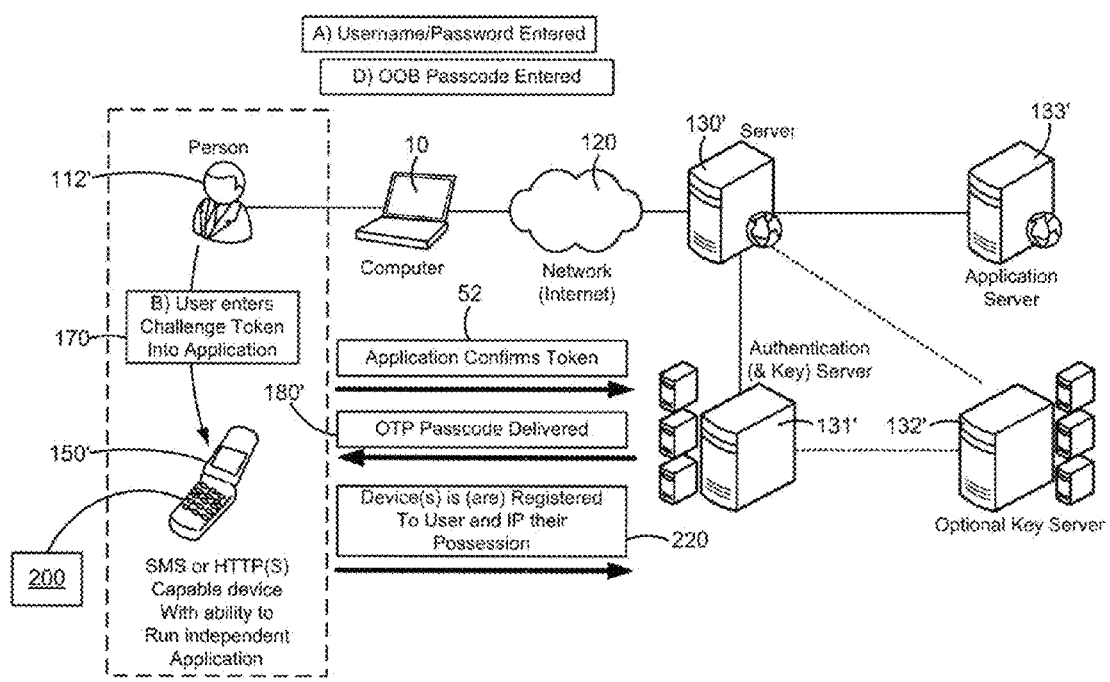
FIG. 3 shows a second embodiment of a system of the present invention along with a method being carried out.

The second embodiment, shown in FIG. 3, is a device-based validation of device possession carried out on the same general system, with slight modifications, and with slightly different steps. In this embodiment, User 112' has a pre-registered SMS or HTML capable device 150' (such as a cell phone or personal digital assistant). This device has data entry (key pad), processing, and storage capability as is well known in the art. Device 150' has an independent Application 200 in its memory, which allows the user to authenticate herself to the device. Application 200 is an application that provides a mechanism to store and update a secret personal knowledge token (e.g. a memorized number or phrase) different from the password entered with the username. This personal knowledge token may be established by the user's enterprise organization or the user herself, such that it can later be used through a challenge and response process to verify that the device is in the possession of the user and not in the hands of another user. Application 200 verifies that the device is in the possession of the person to whom it is registered by the verification of a personal knowledge Token 170, which the User enters into the device to initiation the transaction. Once the User is validated on the device via entry of Token 170, the device 200 sends a secure message 220 to the Authentication and Key Server 131', confirming that User 112' is in possession of the device. Authentication and Key Server 131' then distributes a one-time-passcode (OTP) 180' to the user on the pre-registered device 200 that was just previously validated to be in the proper user's possession.

Once the user has received the OTP 180 via either method discussed herein, or any suitable variation, she enters the OTP in the web dialog with the Server 130 or 130', thereby confirming that the user who has the device is also the same user who submitted a username and password to the Web site or application on the Server 130 or 130'.

Authentication and Key Server 131 or 131' then either informs the Server 130 or 130' or the Application Server 133 or 133' directly through appropriately secured communications protocols that the transaction has been completed satisfactorily or it informs the Key Server 132 or 132' that the authentication transaction has been completed and the key server releases a cryptographic key (either symmetric or asymmetric) to the server 130 or 130' or the application server 133 or 133'. The key released by the key server can either be uniquely representative of the person conducting the authentication (such as PKI) or uniquely representative of the server and the transaction such that it can be non-repudiatively tied back to the user who conducted the authentication transaction.

While the particular Out of Band System and Method for Authentication as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

It is therefore intended that the foregoing detailed description be regarded as illustrative rather than limiting, and that it be understood that it is the following claims, including all equivalents, that are intended to define the spirit and scope of this invention.

We claim:

1. A method for authentication of a user with a device who is attempting a first transaction comprising the steps of:
   establishing the asserted identity of the user;
   informing an authentication server that the user is attempting to conduct a transaction;
   conducting a second transaction with the user's device and the authentication server to verify that the user is in possession of the device, wherein the second transaction comprises:
      providing, via an out of band channel used for establishing the asserted identify of the user, an authentication notification message indicating that the transaction is being conducted and prompting entry of a token, and
      receiving, via the out of band channel, the token;
   in response to receiving the token, sending an out of band one-time passcode to the device registered to the user;
   entering the one-time passcode into the dialogue;
   validating the one-time passcode; and
   authorizing the first transaction.

2. The method of claim 1, further comprising providing, at the device, an application to verify that the user is in possession of the device.

3. The method of claim 2, wherein conducting the second transaction further comprises receiving a secure message from the application verifying that the user is in possession of the device is in the authentication server.

4. The method of claim 1 wherein the transaction is authorized via the release of a symmetric key representative of the individual conducting the transaction.

5. The method of claim 4 wherein the key is representative of the server on which the transaction was conducted, and can be tied to the unique user through non-repudiatory log and audit capabilities.

6. The method of claim 1 wherein the transaction is authorized via the release of an asymmetric key representative of the individual conducting the transaction.

7. The method of claim 6 wherein the key is representative of the server on which the transaction was conducted, and can be tied to the unique user through non-repudiatory log and audit capabilities.

8. The method of claim 1 wherein the out of band passcode is distributed to the end-user's pre-registered device via SMS (text messaging).

9. The method of claim 1 wherein the out of band passcode is distributed to the end-user's pre-registered device via voice.

10. The method of claim 1 wherein the out of band passcode is retrieved by the end-user through the use of their pre-registered voice signature and voice biometrics.

11. A method for authentication of a user with a device who is attempting a transaction comprising the steps of:
    establishing the asserted identity of the user;
    receiving, via an out of band channel used for establishing the asserted identity of the user, a secure message from an application provided at the device verifying that the user is in possession of the device;

sending an out of band one-time passcode to the device registered to the user;
validating the one-time passcode; and
authorizing the transaction via the release of a key,
wherein the key (i) is symmetric or asymmetric, (ii) is representative of the individual conducting the transaction and the server on which the transaction was conducted, and (iii) can be tied to the unique user through non-repudiatory log and audit capabilities.

12. The method of claim 11, further comprising providing the application at the device, wherein the application provides the secure message based on verifying a token.

13. The method of claim 11, wherein the secure message is received a channel other than a second channel used for establishing the asserted identify of the user.

14. A method for authentication of a user with a device who is attempting a first transaction comprising the steps of:
establishing the asserted identity of the user;
conducting a second transaction with the user's device and the authentication server to verify that the user is in possession of the device, wherein the second transaction comprises
providing, via an out of band channel used for establishing the asserted identify of the user, an authentication notification message to the device indicating that the transaction is being conducted and prompting entry of a token,
receiving, via the out of band channel, the token, and
receiving a secure message from an application provided at the device verifying that the user is in possession of the device;
sending an out of band one-time passcode to the device registered to the user; and
entering the one-time passcode into the dialogue to authorize the transaction.

15. The method of claim 14, further comprising providing the application at the device to verify that the user is in possession of the device.

16. The method of claim 14 wherein the transaction is authorized via the release of a symmetric key representative of the individual conducting the transaction.

17. The method of claim 16 wherein the key is representative of the server on which the transaction was conducted, and can be tied to the unique user through non-repudiatory log and audit capabilities.

18. The method of claim 14 wherein the transaction is authorized via the release of an asymmetric key representative of the individual conducting the transaction.

19. The method of claim 18 wherein the key is representative of the server on which the transaction was conducted, and can be tied to the unique user through non-repudiatory log and audit capabilities.

* * * * *